W. TREWHELLA.
DISK CULTIVATOR.
APPLICATION FILED AUG. 23, 1915.
1,193,314.
Patented Aug. 1, 1916.
2 SHEETS—SHEET 1.
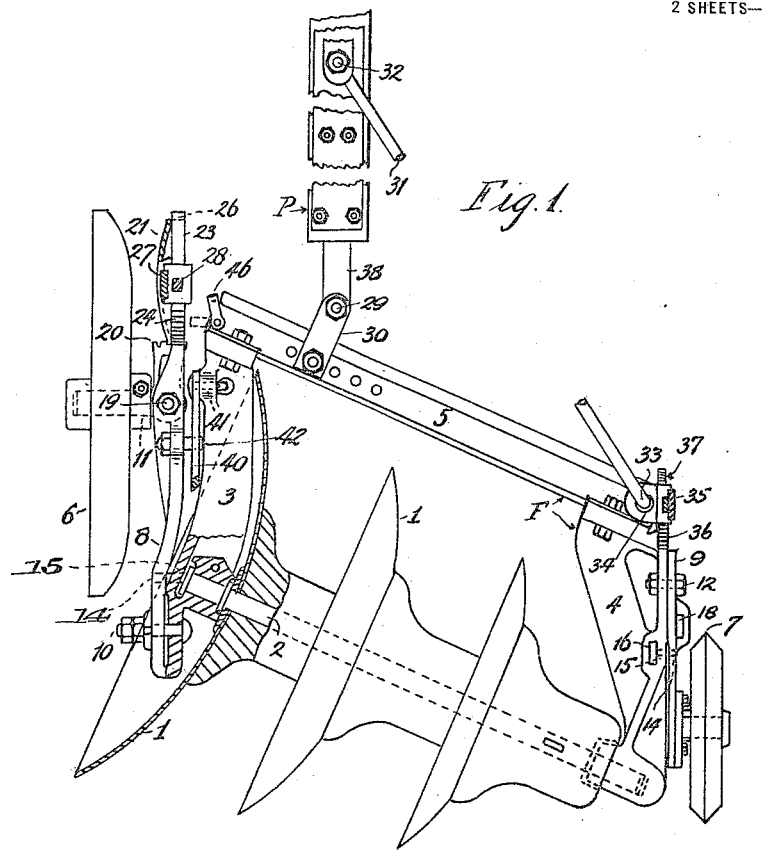
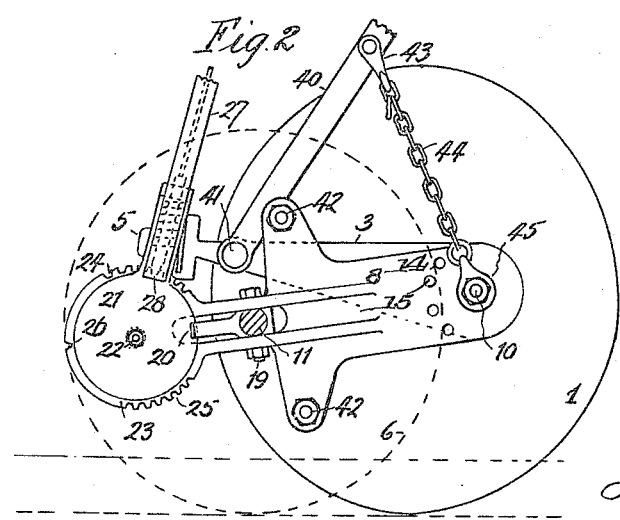
Inventor
William Trewhella
By Henyorth Jr atty.

W. TREWHELLA.
DISK CULTIVATOR.
APPLICATION FILED AUG. 23, 1915.

1,193,314.

Patented Aug. 1, 1916.
2 SHEETS—SHEET 2.

Inventor.
William Trewhella.
By Henry O. Hoyt Jr.
Atty.

UNITED STATES PATENT OFFICE.

WILLIAM TREWHELLA, OF TRENTHAM, VICTORIA, AUSTRALIA.

DISK CULTIVATOR.

1,193,314.   Specification of Letters Patent.   Patented Aug. 1, 1916.

Application filed August 23, 1915. Serial No. 46,936.

*To all whom it may concern:*

Be it known that I, WILLIAM TREWHELLA, a subject of the King of Great Britain, residing at Trentham, in the State of Victoria, Commonwealth of Australia, have invented certain new and useful Improvements in Disk Cultivators, of which the following is a specification.

This invention relates to that class of cultivators in which two or more disks are arranged to revolve about the same axis, and is especially adapted to cultivating on hillside though it is also well suited to cultivating level land.

In cultivating hillsides backward and forward and turning the furrow always down hill, it is necessary to reverse the angle of the axis of the disks relatively with the line of the furrow and the direction of the draft while the supporting wheels are always approximately set in the direction of the furrow and draft. In order to avoid adjustment at each end of the field, the frame, with its disks and supporting wheels, is made invertible and so constructed that by turning the frame and its disks and wheels and connections thereof upside down at each end of the field the necessity for making periodical reversals of angles is avoided. For the better operation of the disks it is preferred to use disks of different diameters on the same axle, the largest disk being on the downhill end, that is, on the end toward which the concave sides of the disks face, and in the accompanying drawings this arrangement is shown, but the invention is equally applicable to a cultivator with a gang of disks all of the same diameter. These and other improvements are described in detail hereinafter with the aid of the accompanying drawings in which is illustrated a cultivator having a gang of disks of varying diameter, but it is to be understood that the frame and mountings illustrated are well adapted to a gang of disks all of even diameter.

Figure 3:
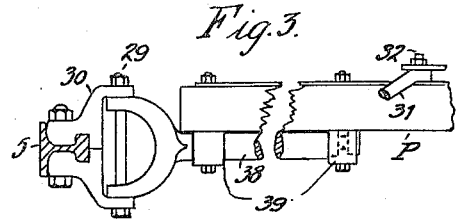
Figure 4:
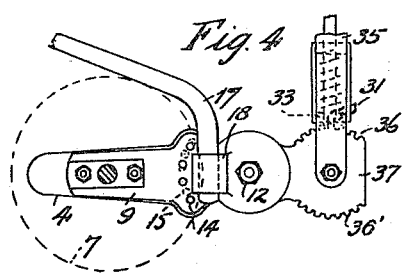
Figure 5:
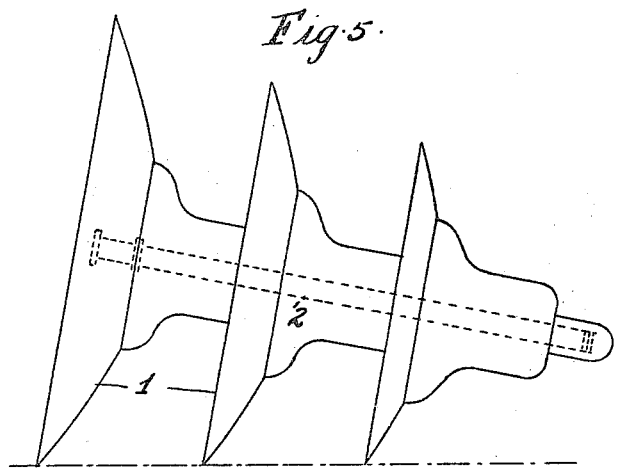

Figure 1 is a diagrammatic plan view (with parts broken away and in section) illustrating by way of example a cultivator with three disks. It is to be noted that the central plane of the implement is horizontal and not tilted as it would be in operation. This is done to enable the construction of the implement to be more clearly understood. Fig. 2 is a left hand side view of Fig. 1 and Fig. 3 a detail view thereof. Fig. 4 is a right hand side view of part of Fig. 1. Fig. 5 is a view of the disks as actually set so that their plane of rotation is not perpendicular to the surface of the ground.

Referring particularly to Fig. 5 it will be observed that the dish shaped disks 1, which may vary in number, may be of successively decreasing diameters from one end to the other and are mounted on an axle 2 set at an inclination to the line of travel of the implement, as in Fig. 1 and at an angle in relation to the ground as in Fig. 5.

The disks are all arranged with their concave sides toward the furrow side of the implement, and when of varying diameters the largest disk is on the furrow side end of the axle as illustrated. If the disks as illustrated all cut equal depths into the soil their axle must necessarily be higher at the end on which is the larger disk and consequently their plane of rotation will not be perpendicular to the surface of the ground but they will have more or less undercut in proportion to the difference of their diameters and the distance they are apart on the axle.

For use on a hillside where on account of its steepness, it is preferable to cultivate backward and forward horizontally, turning the furrow always down hill, rather than up and down the field, the gang of disks which may be of even diameters are arranged at the rear end of the frame to which the team is harnessed, the forward end of said frame being lifted over the gang of disks at each end of the field. The axle 2 is journaled at its ends Fig. 1 in arms 3, 4 extending rearward from a transverse beam 5 set parallel to the axle of the disks and at an inclination to the line of travel of the implement, said beam and arms constituting an approximately U shaped frame F. The frame is supported on the furrow side upon a guide wheel 6 connected with the arm 3 of the frame preferably by means of a hinged bar 8, capable of vertical oscillation whereby if the disks be thrown out of the ground by striking a stone or other obstruction the guide wheel will not thereby be lifted out of contact with the ground. For the same object the land side supporting wheel 7 is similarly mounted on the arm 4 through the medium of an oscillatory bar 9. According to this construction the bar 8 is connected by a pivot 10 to the arm 3 and to the axle 11 of the wheel 6 and if the wheel 7 is employed, though it is not essential, its axle is on the bar 9 and the latter is pivotally connected at 12 to the arm 4. Suitable means are provided for fixing the oscillatory bars 8, 9 at any desired angle in relation to the arms 3, 4 of the frame by holes 14, 15 formed respectively in the bars and arms and adapted to be engaged by a pin.

The arm 4 has a socket 16 to receive a bent lever 17 by which pressure may be applied to this end of the gang to prevent the implement tilting on a steep hillside and this lever may be inserted in a similar socket 18 Fig. 4 in the bar 9 to adjust the depth of the cut of the disks on the land side.

Means are provided to regulate the degree of oscillation of the pivoted arm when necessary to adjust the depth of the cut of the disks and prevent the disks cutting too deeply into the ground. For this purpose a lever 40 is pivoted as at 41 to the arm 3 and is adapted to bear upon either one or the other—according to which side of the frame is uppermost, of two pins 42 projecting from the top and bottom of the bar 8. This lever has a hook 43 adapted to engage with a link of a chain 44 attached as at 45 to the bar. By pulling the lever 40 down, the arm 3 is raised and if desired retained by the chain 44 thus raising the disks and preventing same cutting so deeply into the ground. The furrow end of the beam 5 is provided with a pivoted abutment 46 made preferably U-shaped which is swung out laterally as indicated by dotted lines to be engaged by the lever 40 when the frame is being inverted as hereinafter described.

For the better steering of the implement the guide wheel 6 is adapted to swivel and for this purpose the axle 11 on which it is mounted is cranked and pivoted at 19 to the bar 8, the forward bent portion of the axle being formed with a segmental rack 20, any notch of which is adapted to be engaged by a cam plate 21 pivoted as at 22 to a circularly shaped plate 23 on the forward end of the bar 8, said plate being provided with two series of notches 24, 25 with an intervening notch 26. To this cam plate 21 is attached a lever 27 having a spring tooth 28 adapted to engage with any of the notches. A portion of the edge of the cam plate is inclined or turned outwardly and is engaged by one notch of the rack 20, so that when the plate is partially rotated it swings the rack on its pivot and turns the wheel 6 to the right or left. One notch of the rack affords a workable adjustment, but, if required, the wheel 6 may be turned one way or the other and the cam plate 20 engaged by one or the other notches. This, however, is effected before starting work, and by removing the central bolt 22. The notches 24 or 25 are in use according to the direction of travel of the implement while the notch 26 is engaged by the tooth of the lever when the frame is to be inverted.

Suitable means are provided for varying the angle at which the team pulls in relation to the gang of disks. Accordingly the draft attachment such as a pole or drawbar P with whiffletrees attached or a forecarriage is connected by a pivot 29 to an adjustable bracket 30 on the beam 5 of the frame and said drawbar has a diagonal brace 31 pivoted at its forward end as at 32 to said drawbar and provided at its rear end with a hook 33 adapted to engage a socket 34 formed in a lug on a spring toothed lever 35, the tooth of which is adapted to engage with any recess of either of two series 36, 36' formed in the opposite sides of a rack 37 on the land side end of the frame. Thus by operating the lever 35 the angle of the drawbar relative to the axle of the gang of disks may be varied.

The pivot 29 of the drawbar is passed through the rear end of a swivel rod 38 journaled in bearings 39 on the underside of the drawbar the object of which is to permit the frame of the cultivator when being used on a hillside to be inverted without turning over the pole or whiffletrees after they have been swung till approximately parallel with the axle of the disks preparatory to reversing the implement.

When using the implement on a hillside and it is desired to reverse same at the end of the field, the team and consequently the drawbar P is moved up the hill till the latter is approximately parallel with the axle of the disks. The lever 27 is then engaged by the notch 26, the lever 40 is thrown forward and the abutment 46 swung outwardly to be engaged by said lever 40. By means then of these levers, the frame with the axle 2 of the disks as a pivot, is inverted so that the wheels 6 and 7 are brought to the ground on the opposite side of the disks. The team is then brought right around to the front, the brace 31 attached and the levers 27 and 40 placed in their normal operating positions when the cultivator is straightened and moved by the team so that the guide wheel 6 runs in the last furrow made.

It will be noted that some of the features of the implement are duplicated so that one or other may be brought into use according to which side of the gang of disks the frame is on.

I claim:—

1. In disk cultivators, a plurality of disks, an axle therefor, an invertible frame in which said axle is journaled, a draft attachment for said frame, the draft end of said frame being adapted to be swung over the disks on the axle thereof to face in either direction.

2. In disk cultivators a plurality of disks, an axle therefor, an invertible frame in which said axle is journaled, a draft attachment for said frame adapted to be swung with the latter over the disks on the axle thereof and a guide wheel on the furrow side thereof.

3. In disk cultivators a plurality of disks, an axle therefor, an invertible frame in which said axle is journaled, a draft attachment for said frame adapted to be swung with the latter over the disks on the axle thereof, a guide wheel on the furrow side and a supporting wheel on the land side of said frame.

4. In disk cultivators a plurality of disks, an axle therefor, an invertible frame in which said axle is journaled and a draft attachment for said frame connected thereto by means of a pivot and swivel rod.

5. In disk cultivators, a series of disks, an axle therefor, an approximately U-shaped invertible frame consisting of a beam set inclined to the line of travel and provided with rearwardly extending rigid arms at each end in which the respective ends of the axle are journaled, said axle being parallel to said beam, and a draft attachment on said frame.

6. In disk cultivators, a series of disks, an axle therefor, an approximately U-shaped vertible frame consisting of a beam set inclined to the line of travel and provided with rearwardly extending rigid arms at each end in which the respective ends of the axle are journaled, said axle being parallel to said beam, a draft attachment on said frame, and a guide wheel mounted on an oscillatory bar pivoted on one arm.

7. In disk cultivators, a series of disks, an axle therefor, an approximately U-shaped invertible frame consisting of a beam set inclined to the line of travel and provided with rearwardly extending rigid arms at each end in which the respective ends of the axle are journaled, said axle being parallel to said beam and a guide wheel and supporting wheel each mounted on an oscillatory bar pivoted on the respective arms of the frame.

8. In disk cultivators, a series of disks, an axle therefor, an approximately U-shaped invertible frame consisting of a beam set inclined to the line of travel and provided with rearwardly extending rigid arms at each end in which the respective ends of the axle are journaled, said axle being parallel to said beam and a guide wheel and supporting wheel each mounted on an oscillatory bar pivoted on the respective arms of the frame, and means to control the oscillation of said oscillatory bars.

9. In disk cultivators, a series of disks, an axle therefor, an approximately U-shaped invertible frame consisting of a beam set inclined to the line of travel and provided with rearwardly extending rigid arms at each end in which the respective ends of the axle are journaled, said axle being parallel to said beam, a draft attachment on said frame, a guide wheel mounted on an oscillatory bar pivoted on one arm, a laterally projecting pin on said bar, a lever pivoted on said arm adapted to bear upon said pin, and means to retain said lever.

10. In disk cultivators, a series of disks, an axle therefor, an approximately U-shaped invertible frame consisting of a beam set inclined to the line of travel and provided with rearwardly extending rigid arms at each end in which the respective ends of the axle are journaled, said axle being parallel to said beam, a draft attachment on said frame, a guide wheel and a supporting wheel each mounted on an oscillatory bar pivoted on the respective arms of the frame, and adjustable means for fixing said bars at any desired angle in relation to the arms of the frame.

11. In disk cultivators a plurality of disks, an axle therefor, an invertible frame in which said axle is journaled, a draft attachment for said frame adapted to be swung with the latter over the disks on the axle thereof, a guide wheel on the furrow side of said frame mounted on an axle and means by which the angle of the axle of said wheel relative to the axle of the disks may be varied.

12. In disk cultivators a plurality of disks, an axle therefor, an invertible frame in which said axle is journaled, a draft attachment for said frame, a guide wheel on the furrow side of said frame mounted on a pivoted cranked axle formed with a segmental rack, a spring toothed lever, and an oscillatory cam plate thereon in engagement with said rack.

13. In disk cultivators a plurality of disks, an axle therefor, an invertible frame in which said axle is journaled, a draft attachment for said frame connected thereto by means of a pivot and swivel rod, and means for varying the angle between said draft attachment and the axle of the disks.

14. In disk cultivators a plurality of disks, an axle therefor, an invertible frame in which said axle is journaled, a draft attachment for said frame connected thereto by means of a pivot and swivel rod and a brace pivoted on said draft attachment and detachably connected with a spring toothed lever in engagement with a rack on the frame.

15. In disk cultivators, a series of disks, an axle therefor, an approximately U-shaped invertible frame consisting of a beam set inclined to the line of travel provided with rearwardly extending rigid arms at each end in which the respective ends of the axle are journaled, said axle being parallel to said beam, a draft attachment on said frame, and a supporting wheel mounted on an oscillatory bar on the land side arm of said frame, said bar and arm being each provided with a socket to receive a lever.

In testimony whereof I have hereunto set my hand in presence of two subscribing witnesses.

WILLIAM TREWHELLA.

Witnesses:
EDWARD WATERS,
WALTER CHARLES HART.

Copies of this patent may be obtained for five cents each, by addressing the "Commissioner of Patents, Washington, D. C."